US012703775B2

(12) United States Patent
Tengyu

(10) Patent No.: US 12,703,775 B2
(45) Date of Patent: Aug. 11, 2026

(54) WATERPROOF SHEET, RESIN COMPOSITION, AND SEALING MATERIAL

(71) Applicant: S.B.Sheet Waterproof Systems Co., Ltd., Tokyo (JP)

(72) Inventor: Hidekiyo Tengyu, Tokyo (JP)

(73) Assignee: S.B.Sheet Waterproof Systems Co., Ltd., Tokyo (JP)

( * ) Notice: Subject to any disclaimer, the term of this patent is extended or adjusted under 35 U.S.C. 154(b) by 197 days.

(21) Appl. No.: 18/689,642

(22) PCT Filed: Oct. 5, 2022

(86) PCT No.: PCT/JP2022/037318
§ 371 (c)(1),
(2) Date: Mar. 6, 2024

(87) PCT Pub. No.: WO2023/058693
PCT Pub. Date: Apr. 13, 2023

(65) Prior Publication Data
US 2024/0352206 A1 Oct. 24, 2024

(30) Foreign Application Priority Data
Oct. 8, 2021 (JP) ................................. 2021-166519

(51) Int. Cl.
*C08J 5/18* (2006.01)
*C08K 3/105* (2018.01)
*C08K 3/22* (2006.01)
*C09K 3/10* (2006.01)

(52) U.S. Cl.
CPC ................ *C08J 5/18* (2013.01); *C08K 3/105* (2018.01); *C08K 3/2279* (2013.01); *C09K 3/1006* (2013.01); *C08J 2327/06* (2013.01); *C08J 2433/08* (2013.01); *C09K 2003/1081* (2013.01)

(58) Field of Classification Search
CPC ...... C08J 2327/06; C08J 2433/08; C08J 5/18; C08K 3/105; C08K 3/2279; C08K 5/0016; C08L 27/06; C08L 33/08; C09K 2003/1081; C09K 3/10; C09K 3/1006
See application file for complete search history.

(56) References Cited

FOREIGN PATENT DOCUMENTS

| | | | |
|---|---|---|---|
| CA | 1305270 | C | 7/1992 |
| EP | 0134389 | A2 | 3/1985 |
| EP | 3031854 | A1 | 6/2016 |
| JP | 9-95955 | A | 4/1997 |
| JP | 2011-26393 | A | 2/2011 |

(Continued)

OTHER PUBLICATIONS

Iwasaki et a WO 2019188937 (Year: 2019).*

(Continued)

*Primary Examiner* — Lawrence D Ferguson
(74) *Attorney, Agent, or Firm* — WHDA, LLP

(57) ABSTRACT

A waterproof sheet of the present invention can be applied to a waterproof sheet 30 to be included in a sheet waterproofing structure 10 that provides waterproofing to a building frame 100. The waterproof sheet of the present invention contains a vinyl chloride-based resin and a plasticizer. The plasticizer includes a (meth)acrylic acid ester-based polymer. The acrylic acid ester-based polymer is preferably an acrylic acid ester monopolymer without functionality.

15 Claims, 3 Drawing Sheets

(56) References Cited

FOREIGN PATENT DOCUMENTS

| | | | |
|---|---|---|---|
| JP | 2012-201746 | A | 10/2012 |
| JP | 2013-53517 | A | 3/2013 |
| JP | 2014-199886 | A | 10/2014 |
| JP | 2016-22708 | A | 2/2016 |
| JP | 2017-132996 | A | 8/2017 |
| JP | 2018-28256 | A | 2/2018 |
| JP | 2018-162396 | A | 10/2018 |

OTHER PUBLICATIONS

International Search Report dated Nov. 8, 2022, issued in counterpart International Application No. PCT/JP2022/037318 (2 pages).

* cited by examiner

WATERPROOF SHEET, RESIN COMPOSITION, AND SEALING MATERIAL

TECHNICAL FIELD

The present invention relates to a waterproof sheet used in a sheet waterproofing structure that provides waterproofing to a building frame, a resin composition used for molding such a waterproof sheet, and a sealing material including such a resin composition.

BACKGROUND ART

In recent years, there has been a demand for high durability of buildings. Along with this, a sheet waterproofing structure in which a waterproof sheet (resin sheet) is installed by laying has been adopted for rooftops and balconies of many buildings (see, for example, PTL 1).

This sheet waterproofing structure includes, for example, a waterproof sheet and a plurality of fixing disks. The waterproof sheet laid on at least a portion of a building frame is joined (fixed) to the building frame through the fixing disks. By adopting such a configuration, waterproof properties for the building frame against rainwater and the like are ensured.

In the sheet waterproofing structure having such a configuration, the waterproof sheet contains, for example, a vinyl chloride-based resin and a plasticizer. When the waterproof sheet is exposed to rainwater and sunlight, the plasticizer leaks from the waterproof sheet over time. As a result, flexibility of the waterproof sheet deteriorates, which causes a problem in that cracks, breakage, and the like occur in the waterproof sheet, and water infiltrates into the building frame itself, that is, a problem in that the waterproof properties of the sheet waterproofing structure deteriorate.

Therefore, for the purpose of preventing deterioration of the flexibility of waterproof sheets and the occurrence of cracks, breakage, and the like in waterproof sheets, there is a demand to develop a waterproof sheet in which leaking of plasticizers from a waterproof sheet over time is precisely suppressed or prevented. However, at present, it is the current situation that this leaking of plasticizers from waterproof sheets cannot be considered to be sufficiently suppressed.

CITATION LIST

Patent Literature

[PTL 1] Japanese Unexamined Patent Publication No. 2013-53517

SUMMARY OF INVENTION

Technical Problem

An object of the present invention is to provide a waterproof sheet in which regarding a sheet waterproofing structure that provides waterproofing to a building frame, leaking of a plasticizer from a waterproof sheet included in this sheet waterproofing structure is precisely suppressed or prevented, a resin composition used for molding such a waterproof sheet, and a sealing material used for sealing of such a waterproof sheet.

Solution to Problem

Such an object is achieved by the present invention described in the following (1) to (10).

(1) A waterproof sheet to be included in a sheet waterproofing structure that provides waterproofing to a building frame, the waterproof sheet containing: a vinyl chloride-based resin; and a plasticizer, in which the plasticizer includes a (meth)acrylic acid ester-based polymer.

(2) The waterproof sheet according to the above-described (1), in which the acrylic acid ester-based polymer is an acrylic acid ester monopolymer without functionality.

(3) The waterproof sheet according to the above-described (2), in which the acrylic acid ester monopolymer without functionality has a weight average molecular weight of equal to or more than 1,000 and equal to or less than 5,000.

(4) The waterproof sheet according to the above-described (2) or (3), in which the acrylic acid ester monopolymer without functionality has a glass transition point Tg of equal to or higher than −100° C. and equal to or lower than −30° C.

(5) The waterproof sheet according to any one of the above-described (1) to (4), in which the plasticizer is included in the waterproof sheet at a content of equal to or more than 20.0 parts by weight and equal to or less than 90.0 parts by weight with respect to 100.0 parts by weight of the vinyl chloride-based resin.

(6) The waterproof sheet according to any one of the above-described (1) to (5), further including a stabilizer.

(7) The waterproof sheet according to any one of the above-described (1) to (6), further including a flame retardant.

(8) The waterproof sheet according to any one of the above-described (1) to (7), in which the sheet waterproofing structure includes a first waterproof sheet covering at least a portion of a floor part of the building frame and at least a portion of a wall part erected from the floor part, and the waterproof sheet is applied to the first waterproof sheet.

(9) The waterproof sheet according to any one of the above-described (1) to (7), in which the sheet waterproofing structure includes a first waterproof sheet covering at least a portion of a floor part of the building frame and at least a portion of a wall part erected from the floor part, and a second waterproof sheet covering a portion of the first waterproof sheet, and the waterproof sheet is applied to the second waterproof sheet.

(10) A resin composition used for molding the waterproof sheet according to any one of the above-described (1) to (9), the resin composition including: the vinyl chloride-based resin; and the plasticizer.

(11) A sealing material used for forming a covering layer that selectively covers a vicinity of an end part of the waterproof sheet according to any one of the above-described (1) to (9), the sealing material including:

the vinyl chloride-based resin; the plasticizer; and a solvent.

Advantageous Effects of Invention

According to the present invention, the plasticizer contained in the waterproof sheet includes a (meth)acrylic acid ester-based polymer. By having such a configuration, leaking of plasticizers from a waterproof sheet over time due to exposure of the waterproof sheet to rainwater or sunlight can be precisely suppressed or prevented. Therefore, deterioration of the flexibility of the waterproof sheet due to this leaking (bleed-out) of plasticizers, and furthermore, the occurrence of cracks, breakage, and the like in the waterproof sheet can be precisely suppressed or prevented.

BRIEF DESCRIPTION OF DRAWINGS

FIG. 1 is a partial perspective view partially extracting a first embodiment of a sheet waterproofing structure provided to a building frame.

DESCRIPTION OF EMBODIMENTS

The waterproof sheet, resin composition, and sealing material of the present invention will be described in detail below on the basis of suitable embodiments shown in the attached drawings.

First, prior to explaining the waterproof sheet, resin composition, and sealing material of the present invention, a sheet waterproofing structure installed on a building frame, to which the waterproof sheet of the present invention can be applied, will be described.

<Sheet Waterproofing Structure>

First Embodiment

Figure 1:
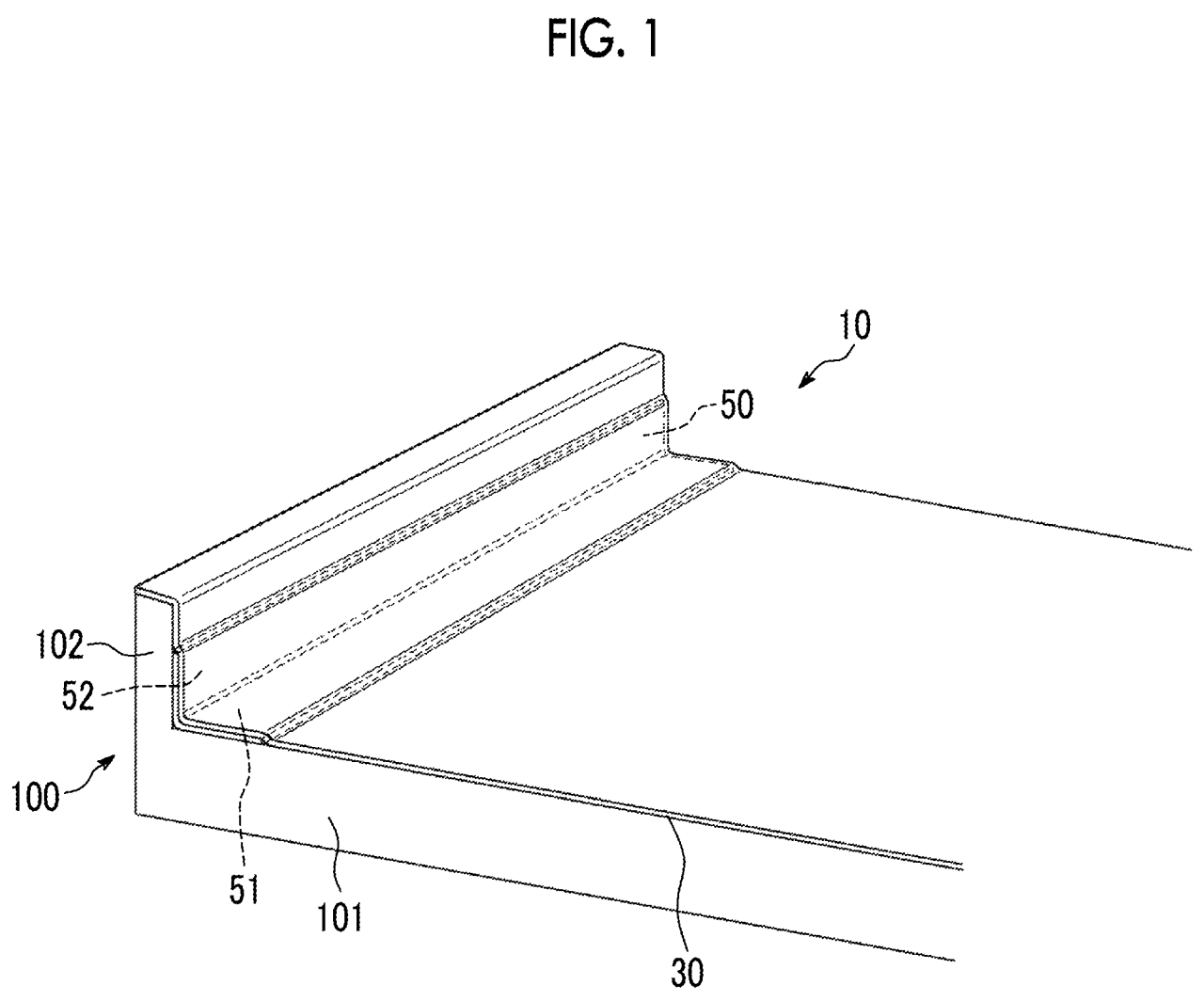
Figure 2:
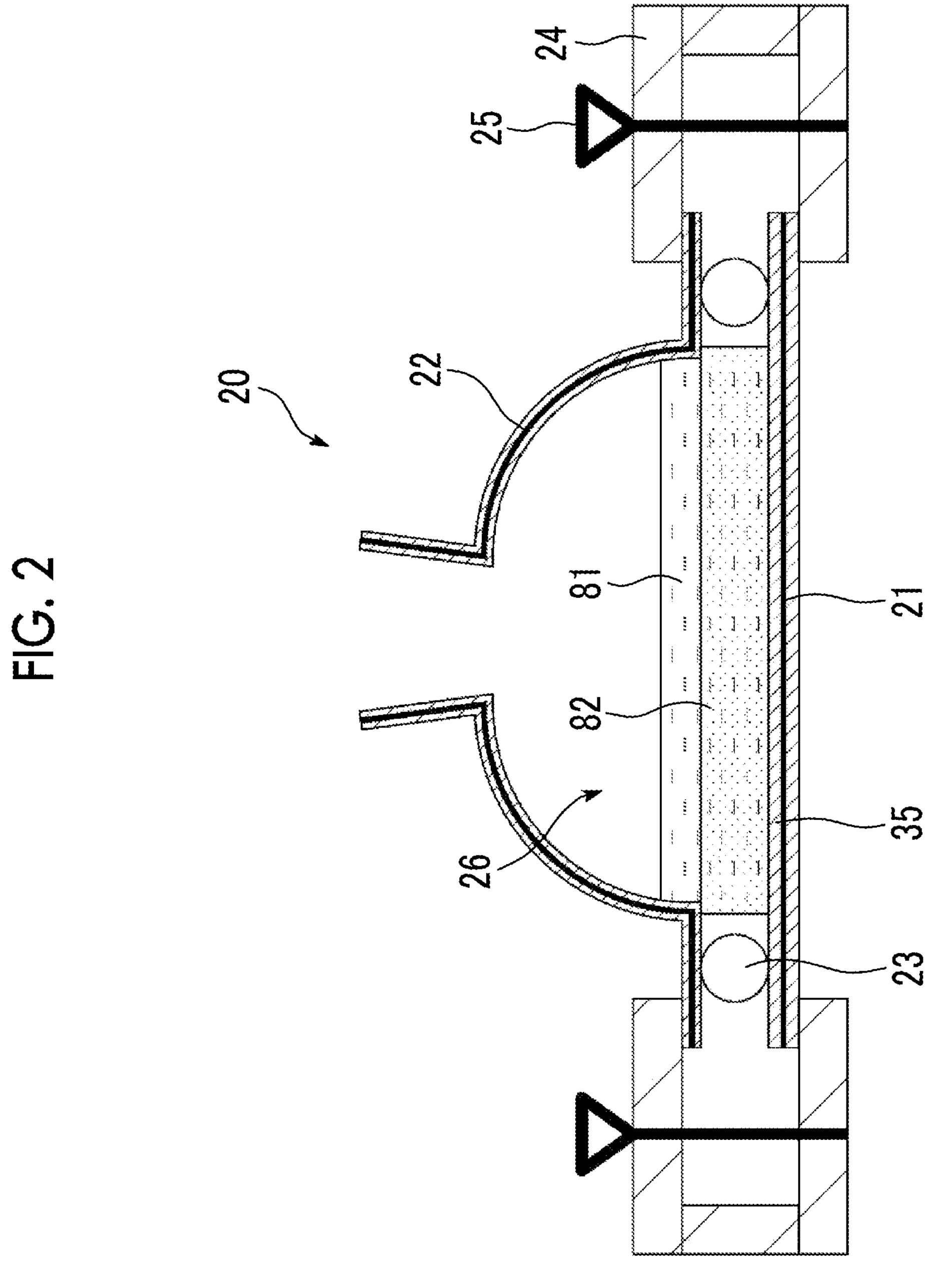
FIG. 2 is a longitudinal cross-sectional view of a storage tank used when determining a residual ratio [%] of a plasticizer in a waterproof sheet by a leakiness evaluation method.

FIG. 1 is a partial perspective view partially extracting a first embodiment of a sheet waterproofing structure provided to a building frame, and FIG. 2 is a longitudinal cross-sectional view of a storage tank used when determining a residual ratio [%] of a plasticizer in a waterproof sheet by a leakiness evaluation method. In the following description, the upper side in FIG. 1 and FIG. 2 is referred to as "up", and the lower side is referred to as "down". Furthermore, in FIG. 1, for convenience of explanation, a floor part and a wall part of a building frame are partially illustrated without showing the entire building frame to which a sheet waterproofing structure is provided. In FIG. 1 and FIG. 2, since the sheet waterproofing structure and the storage tank are each illustrated with favorable visibility, the dimensions differ greatly from the actual dimensions.

The sheet waterproofing structure 10 is configured to be installed on a building frame 100 having a floor part 101 and a wall part 102 (rising part) provided to be erected along the outer edge of the floor part 101. The sheet waterproofing structure 10 includes a waterproof sheet 30 laid on the floor part 101 and the wall part 102, an arrangement member 50, and fixing disks (not shown in the drawing).

The arrangement member 50 has a bottom part 51 and a rising surface 52, whose overall shapes are each a rectangular shape. The arrangement member 50 is arranged at the boundary between the floor part 101 and the wall part 102. Furthermore, a plurality of fixing disks are fixed to the floor part 101 by fixing screws at predetermined (constant) intervals. In this state, the waterproof sheet 30 composed of a vinyl chloride-based resin as a main material covers the floor part 101 and the wall part 102 together with the arrangement member 50, the fixing disks, and the fixing screws, and is fixed to the arrangement member 50 and the fixing disks. As a result, the waterproof properties of the building frame 100 are ensured.

That is, the waterproof sheet 30 is exposed to sunlight and rainwater, the building frame 100 is prevented from being directly exposed to sunlight and rainwater, and thereby the waterproof properties of the building frame 100 are ensured. Furthermore, the top faces of the fixing disks and the bottom face of the waterproof sheet 30 are joined, and thereby, the floor part 101 and the waterproof sheet 30 are joined by means of the fixing disks. As a result, the waterproof sheet 30 is fixed to the building frame 100 without being torn off by wind or the like.

Both the arrangement member 50 and the fixing disks are together composed of a metal plate and a resin layer covering the surface of this metal plate.

This metal plate is configured to be, for example, a steel plate such as a stainless steel plate or an iron plate, an aluminum plate, a copper plate, or the like; however, the metal plate is preferably a steel plate.

A thickness of the metal plate is not particularly limited; however, the thickness is preferably about equal to or more than 0.1 mm and equal to or less than 3 mm, and more preferably about equal to or more than 0.3 mm and equal to or less than 2.5 mm.

Examples of the resin constituting the resin layer include vinyl chloride-based resins such as polyvinyl chloride, polyolefin-based resins, and ethylene-vinyl acetate copolymers, and these can be used singly or in combination of two or more kinds thereof; however, the resin is preferably a vinyl chloride-based resin (particularly, polyvinyl chloride). That is, it is preferable that the resin constituting the resin layer is of the same kind or the same as the resin constituting the waterproof sheet 30 that will be described later. As a result, close adhesion between the resin layer and the waterproof sheet 30 can be improved. Furthermore, polyvinyl chloride has excellent solvent weldability and thermal fusibility. For this reason, the above-mentioned effect can be exhibited more notably, and at the same time, corrosion of the metal plate can be more reliably prevented.

In addition, the resin constituting this resin layer may include other materials such as a plasticizer and a stabilizer, which are mentioned as constituent materials of the waterproof sheet 30 that will be described later.

A thickness of the resin layer is not particularly limited; however, the thickness is preferably equal to or more than 0.1 mm, and more preferably equal to or more than 0.3 mm and equal to or less than 0.8 mm. As a result, even if stress is applied to the resin layer due to wind fanning the waterproof sheet 30, the occurrence of cracks or breakage in this resin layer can be precisely suppressed.

The waterproof sheet 30 (first waterproof sheet) has a sheet shape (plate shape) and is configured to cover the floor part 101 and the wall part 102 together with the arrangement member 50 and the fixing disks.

As a result, the waterproof sheet 30 is exposed to sunlight and rainwater, the building frame 100 is prevented from being directly exposed to sunlight and rainwater, and thereby the waterproof properties of the building frame 100 are ensured.

Such a waterproof sheet 30 is composed of a resin sheet containing a vinyl chloride-based resin and a plasticizer. In the present embodiment, the waterproof sheet of the present invention is applied to this waterproof sheet 30, and the details thereof will be described later.

In addition, the sheet waterproofing structure 10 may include a cloth sheet that is laid on the floor part 101 to be interposed between the floor part 101 and the waterproof sheet 30.

This cloth sheet is composed of, for example, an insulating cloth sheet made of a polyethylene woven fabric. Instead of this, a fireproof sheet formed of glass fibers, an aluminum foil laminated sheet for pinhole inspection, and a walking board formed from a high-rigidity board such as a calcium silicate board, an asbestos slate board, or a lightweight aerated concrete board may be laid on the floor part 101, or a laminated body including these as upper layers and including a heat insulating layer (heat insulating material) composed of expanded polystyrene, polyurethane foam, polyisocyanurate foam, phenol foam, or the like as a lower layer, may also be laid on the floor part 101. By interposing these sheets between the floor part 101 and the waterproof sheet 30, the cushioning properties, insulation properties, heat insulation properties, and the like of the sheet waterproofing structure 10 can be ensured.

<Waterproof Sheet>

As described above, the waterproof sheet of the present invention can be applied to the waterproof sheet 30 included in the sheet waterproofing structure 10 having such a configuration.

The waterproof sheet of the present invention contains a vinyl chloride-based resin and a plasticizer and includes a (meth)acrylic acid ester-based polymer as this plasticizer. In this way, by allowing the waterproof sheet to be configured to include a (meth)acrylic acid ester-based polymer as a plasticizer, the waterproof sheet can precisely suppress or prevent the plasticizer from leaking from the waterproof sheet over time due to exposure to rainwater or sunlight. Therefore, deterioration of the flexibility of the waterproof sheet due to this leaking (bleed-out) of plasticizers, and furthermore, the occurrence of cracks, breakage, and the like in the waterproof sheet can be precisely suppressed or prevented. Therefore, a sheet waterproofing structure 10 including the waterproof sheet of the present invention as the waterproof sheet 30 exhibits excellent waterproof properties.

Hereinafter, the constituent materials constituting the waterproof sheet of the present invention will be described.

(a) Vinyl Chloride-Based Resin

A vinyl chloride-based resin is included in the waterproof sheet as a main material of the waterproof sheet in order to form the waterproof sheet into a sheet-shaped (layered) form.

This vinyl chloride-based resin is not particularly limited as long as it is a polymer, that is, an oligomer, a prepolymer, or a polymer, including vinyl chloride.

Specifically, such a vinyl chloride-based resin may be, for example, a monopolymer (homopolymer) of vinyl chloride, or a copolymer of vinyl chloride and vinyl acetate, ethylene, propylene, or the like, while other examples include a product having a configuration in which a main chain of this monopolymer or copolymer is substituted with another polymer as a side chain to form a grafted structure, and these can be used singly or in combination of two or more kinds thereof. In a case where the main chain of a monopolymer or a copolymer is composed of a monopolymer, the main chain is linear; however, in a case where the main chain is composed of a copolymer, when the copolymer is composed of a random copolymer, an alternating copolymer, or a block copolymer, the main chain is linear, and when the copolymer is a graft copolymer, the main chain is branched.

By using these as the vinyl chloride-based resin, the waterproof sheet can be molded into a sheet shape and can be caused to exhibit a function as a waterproof sheet.

In addition, from the viewpoint of preventing the plasticizer that will be described later, that is, a (meth)acrylic acid ester-based polymer, from leaking (bleeding out) from the waterproof sheet, it is preferable that the overall structure of the vinyl chloride-based resin forms a linear shape. By combining such a vinyl chloride-based resin and a (meth) acrylic acid ester-based polymer, leaking of the (meth) acrylic acid ester-based polymer from the waterproof sheet can be more precisely suppressed or prevented.

(b) Plasticizer

The plasticizer is contained in order to impart excellent flexibility to the waterproof sheet, and in the present invention, a (meth)acrylic acid ester-based polymer is included as this plasticizer.

In this way, by allowing the waterproof sheet to be configured to include a (meth)acrylic acid ester-based polymer as a plasticizer, the waterproof sheet can precisely suppress or prevent the plasticizer from leaking from the waterproof sheet over time due to exposure to rainwater or sunlight. Therefore, deterioration of the flexibility of the waterproof sheet due to this leaking (bleed-out) of plasticizers, and furthermore, the occurrence of cracks, breakage, and the like in the waterproof sheet can be precisely suppressed or prevented. Therefore, a sheet waterproofing structure 10 including the waterproof sheet of the present invention as the waterproof sheet 30 exhibits excellent waterproof properties. Furthermore, by including a (meth)acrylic acid ester-based polymer as the plasticizer, even when the waterproof sheet is exposed to rain and wind, it is possible to precisely suppress or prevent adhesion of contaminants to the waterproof sheet caused by this exposure.

A (meth)acrylic acid ester-based polymer is a polymer containing a (meth)acrylic acid ester as a main monomer component and has a monopolymer (homopolymer) or a copolymer of the (meth)acrylic acid ester as a main chain, and the (meth)acrylic acid ester-based polymer may be composed of this main chain alone or may have a configuration in which this main chain is substituted with another polymer (having no functional group) or a functional group, or with a polymer having a functional group as a side chain, that is, a substituent, to form a grafted structure.

According to the present specification, the term (meth) acrylic acid ester is used to mean both an acrylic acid ester and a methacrylic acid ester.

The (meth)acrylic acid ester is not particularly limited; however, examples thereof include (meth)acrylic acid alkyl esters such as methyl (meth)acrylate, ethyl (meth)acrylate, propyl (meth)acrylate, isopropyl (meth)acrylate, n-butyl (meth)acrylate, isobutyl (meth)acrylate, sec-butyl (meth) acrylate, tert-butyl (meth)acrylate, pentyl (meth)acrylate, hexyl (meth)acrylate, heptyl (meth)acrylate, octyl (meth) acrylate, isooctyl (meth)acrylate, 2-ethylhexyl (meth)acrylate, nonyl (meth)acrylate, isononyl (meth)acrylate, decyl (meth)acrylate, isodecyl (meth)acrylate, undecyl (meth) acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, and octadecyl (meth)acrylate; (meth)acrylic acid cycloalkyl esters such as cyclohexyl (meth)acrylate; and (meth)acrylic acid aryl esters such as phenyl (meth)acrylate, and these can be used singly or in combination of two or more kinds thereof. Among these, (meth)acrylic acid alkyl esters such as methyl (meth)acrylate, ethyl (meth)acrylate, n-butyl (meth)acrylate, 2-ethylhexyl (meth)acrylate, and octyl (meth)acrylate are preferred. (Meth)acrylic acid alkyl esters have particularly excellent heat resistance and can be purchased relatively easily at low cost. In addition, by using a (meth)acrylic acid ester-based polymer in which a (meth)acrylic acid alkyl ester is used as the (meth)acrylic acid ester, leaking of a (meth)acrylic acid ester-based polymer as a plasticizer from the waterproof sheet can be more precisely suppressed or prevented.

In addition, in a case where the (meth)acrylic acid ester-based polymer is composed of a copolymer containing a (meth)acrylic acid ester as a main monomer component as the main chain, this copolymer may be, for example, a copolymer of a (meth)acrylic acid ester and (meth)acrylic acid, acrylonitrile, vinyl acetate, ethylene, propylene, or the like.

The (meth)acrylic acid ester-based polymer that can have a configuration such as described above is preferably such that the monopolymer containing a (meth)acrylic acid alkyl ester as a monomer component is an acrylic acid ester monopolymer without functionality, which is not substituted with the above-described substituent. As a result, leaking of the (meth)acrylic acid ester-based polymer (acrylic acid ester monopolymer without functionality) as the plasticizer from the waterproof sheet can be more precisely suppressed or prevented.

In addition, the weight average molecular weight of the acrylic acid ester monopolymer without functionality is preferably equal to or more than 1,000 and equal to or less than 5,000, and more preferably equal to or more than 2,000 and equal to or less than 3,500.

Furthermore, the glass transition point Tg of the acrylic acid ester monopolymer without functionality is preferably equal to or higher than −100° C. and equal to or lower than-30° C., and more preferably equal to or higher than −95° C. and equal to or lower than −75° C.

By setting the weight average molecular weight and the glass transition point Tg of the acrylic acid ester monopolymer without functionality to be within the above-described ranges, the effect obtained by using an acrylic acid ester monopolymer without functionality as the (meth)acrylic acid ester-based polymer (plasticizer) can be exhibited more notably.

The content percentage of the (meth)acrylic acid ester-based polymer in the waterproof sheet is not particularly limited; however, for example, the content percentage is preferably equal to or more than 20.0 parts by weight and equal to or less than 90.0 parts by weight, and more preferably equal to or more than 50.0 parts by weight and equal to or less than 75.0 parts by weight, based on 100.0 parts by weight of the vinyl chloride-based resin. As a result, excellent flexibility can be reliably imparted to the waterproof sheet, and the function as a waterproof sheet for preventing infiltration of water into the building frame 100 can be reliably exhibited. In addition, the vinyl chloride-based resin, which is a main material, can retain the (meth) acrylic acid ester-based polymer and can more precisely suppress or prevent leaking of the (meth)acrylic acid ester-based polymer as a plasticizer from the waterproof sheet.

From the above description, a preferred combination of the vinyl chloride-based resin and the (meth)acrylic acid ester-based polymer (plasticizer) may be a combination of a vinyl chloride-based resin having a linear overall structure and an acrylic acid ester monopolymer without functionality. By adopting such a combination, leaking of the (meth) acrylic acid ester-based polymer (acrylic acid ester monopolymer without functionality) from the waterproof sheet can be more precisely suppressed or prevented.

Regarding the plasticizer, a (meth)acrylic acid ester-based polymer may be included as an essential component, and another plasticizer may also be included. Specific examples of the other plasticizer are not particularly limited; however, examples thereof include low molecular weight-based plasticizers, such as phthalic acid ester-based plasticizers such as diisononyl phthalate (DINP), dioctyl phthalate (DOP), diisobutyl phthalate (DIBP), and diheptyl phthalate (DHP); aliphatic dibasic acid ester-based plasticizers such as di-2-ethylhexyl adipate (DOA), diisodecyl adipate (DIDA), and di-2-ethylhexyl sebacate (DOS); aromatic carboxylic acid ester-based plasticizers such as ethylene glycol benzoates; and trimellitic acid ester-based plasticizers such as trioctyl trimellitate (TOTM), and high molecular weight-based plasticizers, such as polyester-based plasticizers such as poly (ethylene glycol/adipic acid) ester, poly(1,3-butanediol/adipic acid) ester, and poly(propylene glycol/sebacic acid) ester, and these can be used singly or in combination of two or more kinds thereof. When a low molecular weight-based plasticizer is included as the plasticizer, it is possible to precisely suppress or prevent adhesion of contaminants to the surface of the waterproof sheet.

As described above, by allowing the waterproof sheet to have a configuration including a (meth)acrylic acid ester-based polymer as a plasticizer, leaking of the plasticizer from the waterproof sheet over time can be precisely suppressed or prevented. In addition, the residual ratio [%] of the plasticizer in the waterproof sheet, which is calculated on the basis of leaking of the plasticizer ((meth)acrylic acid ester-based polymer) from the waterproof sheet, can be determined by, for example, using the following evaluation method. By including a (meth)acrylic acid ester-based polymer as a plasticizer, the residual ratio [%] can be set to be equal to or higher than the lower limit value shown below.

That is, in a transferability evaluation method for evaluating the transferability of a plasticizer to a butyl rubber tape, the residual ratio [%] of a plasticizer in a waterproof sheet is first determined by producing a test piece formed from the waterproof sheet and having a size of 2.0 mm in thickness×30 mm in width×100 mm in length, and measuring the elongation percentage [%] of this test piece as the initial elongation percentage [%] on the basis of a tensile test according to JIS A 6008. Next, a butyl rubber tape made of butyl rubber and having a size of 2.0 mm in thickness×35 mm in width×110 mm in length is attached to one side of this test piece. Thereafter, the butyl rubber tape and the test piece are stored in an oven at 80° C. for 28 days, and then the butyl rubber tape is peeled from the test piece. Thereafter, the elongation percentage [%] of the test piece, from which the butyl rubber tape has been peeled off, is measured as the elongation percentage [%] after storage on the basis of a tensile test according to JIS A 6008. Then, the elongation percentage [%] after storage, which is calculated when the initial elongation percentage is taken as 100.0%, is determined as the residual ratio [%] of the plasticizer in the waterproof sheet.

The residual ratio [%] of the plasticizer in the waterproof sheet according to the transferability evaluation method, which is determined as described above, is preferably equal to or higher than 80.0%, and more preferably equal to or higher than 90.0%. By setting the residual ratio [%] of the plasticizer in the waterproof sheet to be equal to or higher than the above-described lower limit value, leaking of the (meth)acrylic acid ester-based polymer (plasticizer) from the waterproof sheet can be said to be precisely suppressed.

In addition, in a volatility evaluation method (weather resistance evaluation method) for evaluating the volatility of a plasticizer by irradiation with a metal halide lamp, the residual ratio [%] of a plasticizer in a waterproof sheet is first determined by producing a test piece formed from the waterproof sheet and having a size of 2.0 mm in thickness× 50 mm in width×100 mm in length, and measuring the elongation percentage [%] of this test piece as the initial elongation percentage [%] on the basis of a tensile test according to JIS A 6008. Next, the test piece is placed on a black panel, and then this test piece is irradiated with a metal halide lamp under the conditions of an irradiation intensity of 81 mW/cm$^2$, a spray cycle of 2 minutes out of 120 minutes, a black panel temperature of 80° C., and an irradiation time of 1800 hours. Thereafter, the elongation percentage [%] of the test piece after irradiation with a metal halide lamp is measured as the elongation percentage [%] after irradiation, on the basis of the tensile test according to JIS A 6008. Then, the elongation percentage [%] after irradiation, which is calculated when the initial elongation percentage is taken as 100.0%, is determined as the residual ratio [%] of the plasticizer in the waterproof sheet.

The residual ratio [%] of the plasticizer in the waterproof sheet according to the volatility evaluation method, which is determined as described above, is preferably equal to or higher than 80.0%, and more preferably equal to or higher than 90.0%. By setting the residual ratio [%] of the plasticizer in the waterproof sheet to be equal to or higher than the above-described lower limit value, leaking of the (meth) acrylic acid ester-based polymer (plasticizer) from the waterproof sheet can be said to be precisely suppressed.

Furthermore, in a leakiness evaluation method for evaluating the leakiness of a plasticizer by repeated wetting and drying in a sludge volume state, the residual ratio [%] of the plasticizer in the waterproof sheet is determined by using the storage tank 20 shown in FIG. 2.

As shown in FIG. 2, the storage tank 20 includes a flat plate-shaped bottom plate 21, a cover member 22 having an upper opening and a lower opening, an annular-shaped gasket 23, clips 24, and fixing screws 25.

The bottom plate 21 is composed of a SUS substrate and has a size of 90 mm in length×90 mm in width. The cover member 22 is a shell formed of transparent glass, whose overall shape is a hemispherical shape. The cover member 22 includes an upper opening and a lower opening, and has a protrusion part that protrudes above the upper opening and an edge part that protrudes laterally to the sides of the lower opening. The lower opening has a circular shape, and its diameter is set to Φ60 mm.

A test piece 35 formed from a waterproof sheet produced to have a size of 2.0 mm in thickness×90 mm in length×90 mm in width is placed on this bottom plate 21. Furthermore, while in a state that the gasket 23 and the cover member 22 are placed in this order on the test piece 35, the edge part of the bottom plate 21 and the edge part of the cover member 22 are clipped by the clips 24, and these clips 24 are screwed with the fixing screws 25. As a result, the edge part of the bottom plate 21 and the edge part of the cover member 22 are fixed by the clips 24 and the fixing screws 25. As a result, in this storage tank 20, a storage space 26 is defined by the cover member 22, the gasket 23, and the test piece 35. On the bottom face of this storage space 26, the surface of the test piece 35 has a circular shape with a diameter of @60 mm and is exposed so as to face the inside of the storage space 26.

That is, in the storage tank 20 including the storage space 26 with an upper opening, the surface (top face) of the test piece 35 has a circular shape of Φ60 mm, with a portion thereof being exposed, at the bottom face (bottom part) of the storage space 26.

In the leakiness evaluation method of using a storage tank 20 having such a configuration, prior to the use, first, the weight [g] of the test piece 35 produced into the size as described above is measured as the initial weight. Next, the test piece 35 is mounted in the storage tank 20, and then 15 g of sludge 82 (test powder 1 (11-kind type) of JIS Z 8901) and 25 mL of pure water 81 are added to the storage space 26 of this storage tank 20.

Thereafter, the storage tank 20 in this state is stored in an oven at 80° C. for 84 days. At this time, the test piece 35 is exposed to conditions of repeated wetting and drying by adding 25 mL of pure water 81 every 12 hours in the morning and evening (twice a day). Thereafter, the test piece 35 is taken out from the storage tank 20, and the weight [g] of the test piece 35 after being washed and dried is measured as the weight after repeated wetting and drying. Then, the weight [%] after repeated wetting and drying, which is calculated when the initial weight is taken as 100.0%, is determined as the residual ratio [%] of the plasticizer in the waterproof sheet.

The residual ratio [%] of the plasticizer in the waterproof sheet according to the leakiness evaluation method, which is determined as described above, is preferably equal to or higher than 93.08, and more preferably equal to or higher than 96.08. By setting the residual ratio [%] of the plasticizer in the waterproof sheet to be equal to or higher than the above-described lower limit value, leaking of the (meth) acrylic acid ester-based polymer (plasticizer) from the waterproof sheet can be said to be precisely suppressed.

(c) Other Constituent Materials

The waterproof sheet 30 may also include, in addition to the vinyl chloride-based resin and the plasticizer, other constituent materials such as a stabilizer, a stabilizer aid, an oxidation inhibitor, an ultraviolet absorber, a processing aid, a lubricating agent, a filler material, a flame retardant, a shielding material, and a coloring material.

Examples of the flame retardant include organic flame retardants and inorganic flame retardants. As the organic flame retardants, for example, a halogen-based flame retardant, a phosphorus-based flame retardant, a silicone-based flame retardant, and a nitrogen-based flame retardant can be used. Furthermore, as the inorganic flame retardants, a metal hydroxide-based flame retardant, zinc stannate, zinc borate, silica, and an antimony-based flame retardant can be used. Examples of the halogen-based flame retardant include bromine compounds such as tetrahydrobisphenol A (TBBPA), chlorine compounds such as chlorinated paraffin, and a tetrafluoroethylene resin (PTFE), which is a fluororesin. Examples of the phosphorus-based flame retardant include red phosphorus, tricresyl phosphate (TCP), cresyl diphenyl phosphate (CDP), and tris(chloropropyl) phosphate (TMCPP). Examples of the silicone-based flame retardant include a methyl phenyl silicone resin. Examples of the nitrogen-based flame retardant include melamine cyanurate. Examples of the metal hydroxide-based flame retardant include magnesium hydroxide and aluminum hydroxide. Examples of the antimony-based flame retardant include antimony trioxide, antimony tetroxide, antimony pentoxide, sodium antimonate, and antimony phosphate, and antimony trioxide is preferably used.

Furthermore, the content percentage of the flame retardant in the waterproof sheet is not particularly limited; however, for example, the content percentage is preferably equal to or more than 0.1 parts by weight and equal to or less than 20.0 parts by weight, and more preferably equal to or more than 0.5 parts by weight and equal to or less than 10.0 parts by weight, based on 100.0 parts by weight of the vinyl chloride-based resin. As a result, excellent flame retardancy can be reliably imparted to the waterproof sheet.

Examples of the stabilizer include an organic tin-based stabilizer, an organic silicone-based stabilizer, an ester-based stabilizer such as butyl stearate, a calcium-zinc-based stabilizer, a barium-zinc-based stabilizer, and a barium-cadmium-based stabilizer. Examples of the stabilizer aid in this case include epoxidized soybean oil, epoxidized linseed oil, epoxidized polybutadiene; and organic phosphoric acid esters such as tricresyl phosphate (TCP), trixylyl phosphate (TXP), tributyl phosphate (TBP), tri-2-ethylhexyl phosphate, and 2-ethylhexyl diphenyl phosphate.

In addition to being composed of a single layer of a resin sheet formed of the above-mentioned constituent materials, the waterproof sheet may also have, for example, a configuration in which a fiber layer is inserted in the middle of the thickness direction, that is, a configuration of a laminated body in which a fiber layer (fiber sheet) is sandwiched between a first resin layer and a second resin layer laminated in the thickness direction. Regardless of whether such a waterproof sheet is composed of a single layer or a laminated body, a layer of a resin sheet composed of the above-mentioned constituent materials is located as the outermost layer.

This fiber layer is composed of an aggregate of fibers, and examples include fiber sheets, such as cloth such as a woven fabric or a non-woven fabric, and a net having a plurality of lattices formed by warp yarns and weft yarns. By configuring the waterproof sheet to include such a fiber layer, the strength (tear strength, tensile strength, and the like) and durability (cyclic fatigue resistance characteristics) of the waterproof sheet can be improved.

The thickness of the waterproof sheet is not particularly limited; however, for example, the thickness is preferably about equal to or more than 0.5 mm and equal to or less than 3 mm, and more preferably about equal to or more than 0.8 mm and equal to or less than 3 mm. As a result, when a waterproof sheet is applied to the waterproof sheet 30, the floor part 101 and the wall part 102 can be reliably covered with the waterproof sheet 30. Furthermore, even when plasticizers inadvertently leak from the waterproof sheet 30, causing its flexibility to decrease, the occurrence of cracks and breakage in the waterproof sheet 30 can be precisely suppressed in an early stage.

Furthermore, the waterproof sheet can be molded, for example, as follows. That is, first, a vinyl chloride-based resin, a plasticizer, and optionally other constituent materials are uniformly mixed by using a mixer, and thereby a resin composition (resin composition of the present invention) composed of powder is obtained. Thereafter, this resin composition is heated and kneaded and then is formed into a sheet shape using a roll, and thereby a sheet body in a heated state is molded. Then, by further hot pressing this sheet body and then cooling it, a waterproof sheet can be molded. A resin composition composed of powder may be molded into a pellet shape, and this pelletized resin composition may be used to mold a waterproof sheet having a sheet shape.

Second Embodiment

In addition to the case of having the configuration described in the first embodiment, the sheet waterproofing structure 10 may have a configuration as shown below.

Figure 3:
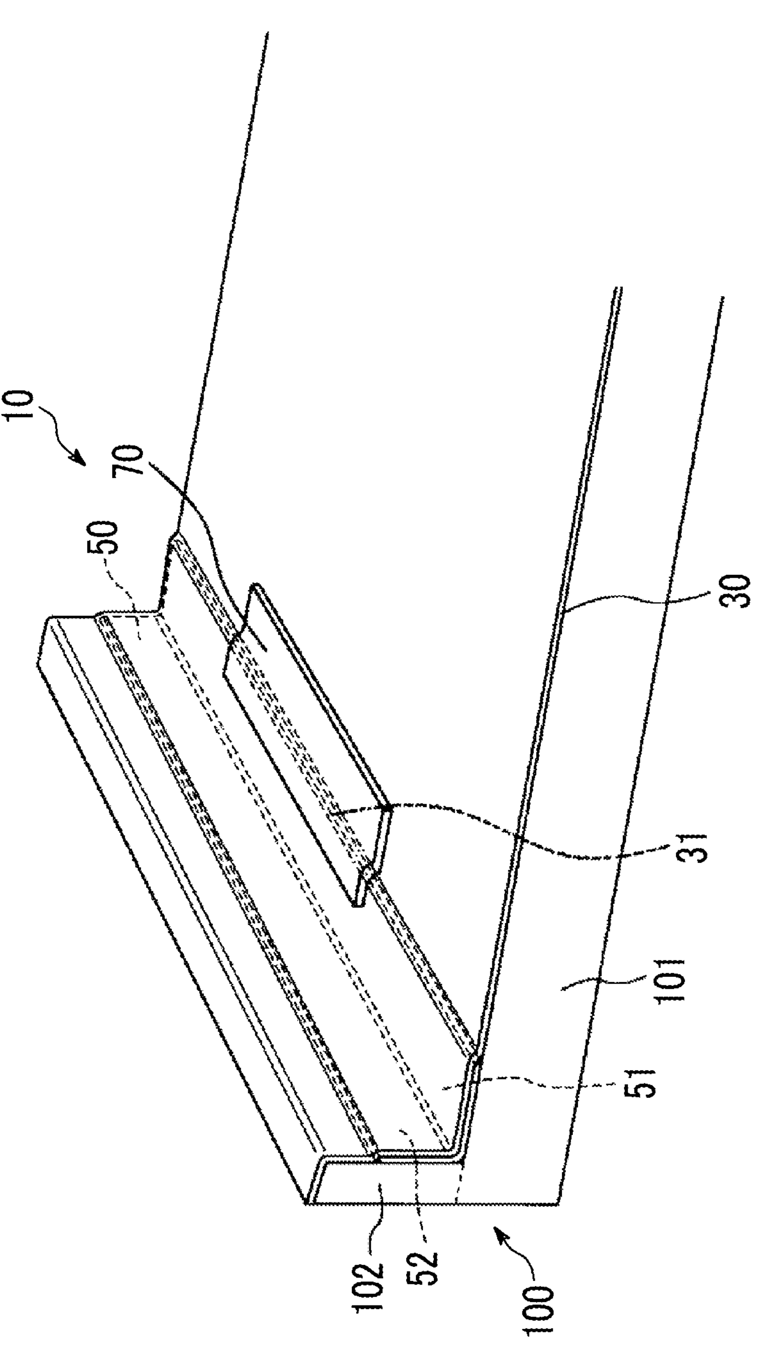
FIG. 3 is a partial perspective view partially extracting a second embodiment of the sheet waterproofing structure provided to a building frame.

FIG. 3 is a partial perspective view partially extracting a second embodiment of the sheet waterproofing structure provided to a building frame. In the following description, the upper side in FIG. 3 is referred to as "up", and the lower side is referred to as "down". Furthermore, in FIG. 3, for convenience of explanation, a floor part and a wall part of a building frame are partially illustrated without showing the entire building frame to which a sheet waterproofing structure is provided. In FIG. 3, since the sheet waterproofing structure is illustrated with favorable visibility, the dimensions differ greatly from the actual dimensions.

Hereinafter, the second embodiment of the sheet waterproofing structure 10 will be described with reference to this drawing; however, the differences between the second embodiment and the above-described embodiment will be mainly described, and the same matters will not be repeated here.

The sheet waterproofing structure 10 of the present embodiment is similar to the sheet waterproofing structure 10 of the first embodiment, except that the sheet waterproofing structure of the present embodiment further includes a waterproof sheet 70 (second waterproof sheet) that partially covers the waterproof sheet 30 (first waterproof sheet).

That is, as shown in FIG. 3, according to the present embodiment, in the sheet waterproofing structure 10, a waterproof sheet 70 is strip-shaped and is attached to the waterproof sheet 30 covering the boundary between the floor part 101 and the bottom part 51 of the arrangement member 50 so as to cope with a level difference 31 formed in the waterproof sheet 30.

In other words, the waterproof sheet 70 is configured as a small piece formed to be smaller than the waterproof sheet 30 so that the waterproof sheet 70 can be thereby selectively attached to a part of the waterproof sheet 30. In the present embodiment, the waterproof sheet 70 is attached to the waterproof sheet 30 so as to cover the level difference 31 of the waterproof sheet 30.

In the area where the level difference 31 is formed in the waterproof sheet 30, stress is easily applied to the waterproof sheet 30, and cracks, breakage, and the like are likely to occur in the waterproof sheet 30 because sand and dust are likely to accumulate when rainwater flows onto the waterproof sheet 30.

Therefore, by selectively attaching the waterproof sheet 70 to the area of the level difference 31 where cracks, breakage, and the like have occurred, or the area of the level difference 31 where cracks, breakage, and the like are predicted to occur in advance, infiltration of water into the building frame 100 itself can be precisely suppressed or prevented. That is, the waterproof sheet 70 functions as a water stop sheet that prevents water from infiltrating into the building frame 100 itself through the waterproof sheet 30 in which cracks, breakage, and the like have occurred.

In the sheet waterproofing structure 10 of the second embodiment having such a configuration, the waterproof sheet of the present invention can be applied to at least one of the waterproof sheet 30 and the waterproof sheet 70 included in the sheet waterproofing structure 10, and in the waterproof sheets 30 and 70 to which the waterproof sheet of the present invention is applied, effects similar to those described in the first embodiment are obtained.

In the present embodiment, a case in which the overall shape of the waterproof sheet 70 is a strip shape corresponding to the shape of the level difference 31 of the waterproof sheet 30 has been described; however, the embodiment is not limited to the case of having such a shape. For example, in a case where the waterproof sheet 70 is selectively attached to the waterproof sheet 30 located at an internal corner between the floor part 101 and the wall part 102 of the building frame 100, the waterproof sheet 70 may be molded into a shape corresponding to the shape of the internal corner.

In addition, in the sheet waterproofing structure 10 of the present embodiment, a sealing part (covering layer) that joins the waterproof sheet 30 and the waterproof sheet 70 may be formed in the vicinity of an end part of the waterproof sheet 70, for the purpose of attempting improvement of the close adhesion of the waterproof sheet 70 to the waterproof sheet 30. In this case, the sealing part can be formed by, for example, supplying a cream-like (paste-like) sealing material including a vinyl chloride-based resin, a plasticizer, and a solvent, to the area where the sealing part is to be provided, and then drying the sealing material. When this sealing material includes a (meth)acrylic acid ester-based polymer as a plasticizer, that is, when the sealing material of the present invention is used as this sealing material, in the sealing part formed from the sealing material, leaking of the plasticizer, that is, the (meth)acrylic acid ester-based polymer, can be precisely suppressed or prevented.

The solvent included in this sealing material is not particularly limited; however, examples thereof include hydrocarbon-based solvents such as n-hexane, toluene, and o-xylene; ketone-based solvents such as acetone, methyl ethyl ketone (MEK), and cyclohexanone; ester-based solvents such as ethyl acetate and isobutyl acetate; ether-based solvents such as diethyl ether and tetrahydrofuran (THE); and alcohol-based solvents such as methanol, ethanol, and 1-propanol, and these can be used singly or in combination of two or more kinds thereof. By using these as the solvent, the vinyl chloride-based resin may be dissolved in the sealing material to prepare the sealing material in a cream-like (paste-like) form.

The sealing part (covering layer) formed by using the sealing material is not limited to the vicinity of an end part of the waterproof sheet 70 and may also be formed in the vicinity of an end part of the waterproof sheet 30.

The waterproof sheet, resin composition, and sealing material of the present invention have been described above; however, the present invention is not limited to these.

For example, in the waterproof sheet, resin composition, and sealing material of the present invention, each configuration can be substituted with any configuration that can exhibit a similar function, or can be added with any configuration.

EXAMPLES

Next, specific Examples of the present invention will be described.

The present invention is not intended to be limited to the description of these Examples.

1. Preparation of Raw Materials

First, the raw materials used for manufacturing the waterproof sheet of each of Examples, Reference Example, and Comparative Example are shown below.

(Vinyl Chloride-Based Resin)

Particles (average particle size: 1 μm) composed of a monopolymer of vinyl chloride were prepared as the vinyl chloride-based resin.

(Plasticizer 1)

As a plasticizer 1, an acrylic acid ester monopolymer without functionality (manufactured by Toagosei Co., Ltd., "ARUFON UP-1021") was prepared.

(Plasticizer 2)

As a plasticizer 2, a polyester-based plasticizer (manufactured by DIC Corporation, "POLYCIZER W-2640-S") was prepared.

(Plasticizer 3)

As a plasticizer 3, diisononyl phthalate (DINP, manufactured by J-PLUS Co., Ltd.) was prepared.

(Plasticizer 4)

As a plasticizer 4, an ethylene-acrylic acid ester copolymer (manufactured by Dow-Mitsui Polychemicals Co., Ltd., "ELVALOY HP441") was prepared.

(Flame Retardant)

As a flame retardant, antimony trioxide (Nihon Seiko Co., Ltd., "PATOX-M") was prepared.

(Stabilizer)

As a stabilizer, a barium-zinc-based stabilizer (manufactured by Sakai Chemical Industry Co., Ltd.) was prepared.

(Stabilizer Aid)

As a stabilizer aid, epoxidized soybean oil (manufactured by ADEKA Corporation, "0-130P") was prepared.

(Ultraviolet Absorber)

A benzotriazole-based ultraviolet absorber (manufactured by BASF SE) was prepared as an ultraviolet absorber.

(Shielding Material)

Titanium oxide was prepared as a shielding material.

(Filler Material)

Calcium carbonate was prepared as a filler material.

(Coloring Material)

Carbon black (manufactured by Mitsubishi Chemical Corporation, "MITSUBISHI CARBON BLACK #45") was prepared as a coloring material.

2. Production of Waterproof Sheet

Example 1

First, 100.0 parts by weight of the vinyl chloride-based resin, 65.0 parts by weight of the plasticizer 1, 6.0 parts by weight of the stabilizer, 3.0 parts by weight of the stabilizer aid, 0.5 parts by weight of the ultraviolet absorber, 15.0 parts by weight of the shielding material, 20.0 parts by weight of the filler material, and 0.4 parts by weight of the coloring material were uniformly mixed at the above-described mixing ratio at 25° C. by using a mixer to obtain a resin composition A.

Next, the resin composition A was heated and kneaded, and then was formed into a sheet shape by using a roll to mold a sheet body in a heated state. The waterproof sheet of Example 1 was obtained by cooling the sheet body. The thickness of this waterproof sheet of Example 1 was 2.0 mm.

Example 1A, Example 1B, Example 2, Example 2A, Reference Example 1, and Comparative Example 1

Waterproof sheets of Example 1A, Example 1B, Example 2, Example 2A, Reference Example 1, and Comparative Example 1 were produced in the same manner as in Example 1, except that the type of the plasticizer added to the resin composition A, the amount of the plasticizer added, and the amount of the flame retardant added were each changed as shown in Table 1.

3. Evaluation

The waterproof sheet of each of the Examples, Reference Example, and Comparative Example was evaluated by using the following methods.

3-1. Evaluation of Transferability to Butyl Rubber Tape

First, test pieces formed from the waterproof sheets of each of Examples, Reference Example, and Comparative Example and each having a size of 2.0 mm in thickness×30 mm in width×100 mm in length were produced, and the elongation percentages [%] of these test pieces were measured as the initial elongation percentages [%] on the basis of a tensile test according to JIS A 6008.

Next, a butyl rubber tape formed of butyl rubber and having a size of 2.0 mm in thickness×35 mm in width×110 mm in length was attached to one side of each test piece based on each of the Examples, Reference Example, and Comparative Example. Thereafter, these butyl rubber tapes and test pieces were stored in an oven at 80° C. for 28 days, and then the butyl rubber tape was peeled from each test piece.

Next, the elongation percentage [%] of each test piece from which the butyl rubber tape had been peeled was measured as the elongation percentage [%] after storage, on the basis of a tensile test according to JIS A 6008. Then, the elongation percentage [%] after storage, which was calculated when the initial elongation percentage was taken as 100.0%, was determined as the residual ratio [%] of the plasticizer in the waterproof sheet, and the residual ratio [%] of the plasticizer in this obtained waterproof sheet was evaluated on the basis of the following evaluation criteria.

(Evaluation of Residual Ratio of Plasticizer in Transferability Evaluation)

A: The residual ratio of the plasticizer in the waterproof sheet is equal to or more than 90.0%.

B: The residual ratio of the plasticizer in the waterproof sheet is equal to or more than 80.0% and less than 90.0%.

C: The residual ratio of the plasticizer in the waterproof sheet is equal to or more than 60.0% and less than 80.0%.

D: The residual ratio of the plasticizer in the waterproof sheet is less than 60.0%.

3-2. Evaluation of Volatility by Irradiation with Metal Halide Lamp

First, test pieces formed from the waterproof sheets of each of the Examples, Reference Example, and Comparative Example and each having a size of 2.0 mm in thickness×50 mm in width×100 mm in length were produced, and the elongation percentages [$] of these test pieces were measured as the initial elongation percentages [%] on the basis of a tensile test according to JIS A 6008.

Next, each of the test pieces based on each of the Examples, Reference Example, and Comparative Example was placed on a black panel, and then each test piece was irradiated with a metal halide lamp under the conditions of an irradiation intensity of 81 mW/cm$^2$, a spray cycle of 2 minutes out of 120 minutes, a black panel temperature of 80° C., and an irradiation time of 1800 hours.

Next, the elongation percentage [%] of each test piece after irradiation with a metal halide lamp was measured as the elongation percentage [%] after irradiation, on the basis of the tensile test according to JIS A 6008. Then, the elongation percentage [%] after irradiation, which was calculated when the initial elongation percentage was taken as 100.0%, was determined as the residual ratio [%] of the plasticizer in the waterproof sheet, and the residual ratio [%] of the plasticizer in this obtained waterproof sheet was evaluated on the basis of the following evaluation criteria.

(Evaluation of Residual Ratio of Plasticizer in Volatility Evaluation)

A: The residual ratio of the plasticizer in the waterproof sheet is equal to or more than 90.0%.

B: The residual ratio of the plasticizer in the waterproof sheet is equal to or more than 80.0% and less than 90.0%.

C: The residual ratio of the plasticizer in the waterproof sheet is equal to or more than 60.0% and less than 80.0%.

D: The residual ratio of the plasticizer in the waterproof sheet is less than 60.0%.

3-3. Evaluation of Leakiness by Repeated Wetting and Drying in Sludge Volume State First, test pieces formed from the waterproof sheets of each of Examples, Reference Example, and Comparative Example and each having a size of 2.0 mm in thickness×90 mm in length×90 mm in width were produced, and the weights [g] of these test pieces were measured as the initial weights [g].

Next, each test piece based on each of the Examples, Reference Example, and Comparative Example was mounted in the storage tank 20 shown in FIG. 2, and then 15 g of sludge 82 (test powder 1 (manufactured by the Association of Powder Process Industry and Engineering, Japan, 11-kind type) of JIS Z 8901) and 25 mL of pure water 81 were added to the storage space 26 of this storage tank 20. Thereafter, the storage tank 20 in this state was stored in an oven at 80° C. for 84 days. At this time, addition of 25 mL of pure water 81 was performed every 12 hours in the morning and evening (twice a day). Thereafter, each test piece was taken out from the storage tank 20 and was washed and dried.

Next, the weight [g] of each test piece after repeated wetting and drying was measured as the weight [g] after repeated wetting and drying. Then, the weight [%] after repeated wetting and drying, which was calculated when the initial weight was taken as 100.0%, was determined as the residual ratio [%] of the plasticizer in the waterproof sheet, and the residual ratio [%] of the plasticizer in this obtained waterproof sheet was evaluated on the basis of the following evaluation criteria.

(Evaluation of Residual Ratio of Plasticizer in Leakiness Evaluation by Repeated Wetting and Drying)

A: The residual ratio of the plasticizer in the waterproof sheet is equal to or more than 96.0%.

B: The residual ratio of the plasticizer in the waterproof sheet is equal to or more than 93.0% and less than 96.0%.

C: The residual ratio of the plasticizer in the waterproof sheet is equal to or more than 90.0% and less than 93.0%.

D: The residual ratio of the plasticizer in the waterproof sheet is less than 90.0%.

3-4. Evaluation of Contamination Resistance by Outdoor Exposure

First, test pieces formed from the waterproof sheets of each of Examples, Reference Example, and Comparative Example and each having a size of 2.0 mm in thickness×60 mm in width×100 mm in length were produced, and then each of the test pieces was disposed outdoors with great exposure to sunlight and was left to stand there for 1 year and 6 months.

Next, for each of the test pieces after standing, the contamination state thereof was observed by visual inspection, and the contamination state on this observed waterproof sheet was evaluated on the basis of the following evaluation criteria.

(Evaluation of Contamination of Waterproof Sheet in Contamination Resistance Evaluation)

A: Almost no contamination is observed on the waterproof sheet.

B: Although slight contamination is observed on the waterproof sheet, it is hardly noticeable.

C: Obvious contamination is observed on a portion of the waterproof sheet.

D: Obvious contamination is observed on almost the entire surface of the waterproof sheet.

The results of these evaluations are shown in Table 1.

3-5. Evaluation of Combustibility

Evaluation of combustibility was performed by the procedure of the UL94HB horizontal combustion test. Specifically, test pieces formed from waterproof sheets of each of Examples, Reference Example, and Comparative Example and each having a size of 2 mm in thickness×13 mm in width×125 mm in length were produced. Thereafter, one end (proximal end) of each of the test pieces was fixed with a clamp part such that the longitudinal direction of each of the test pieces was horizontal. As a result, the other end (distal end) of the test piece became a free end. A wire mesh was fixed with another clamp part such that the wire mesh was located below the test piece. Thereafter, the flame of a burner tube was brought into contact (flame contact) with the free end of the test piece in a state in which the central axis of the burner tube was tilted at an angle of 45° with respect to the horizontal plane. The flame contact time was 30 seconds.

Next, for each of the test pieces after flame contact, the state of flame spread and extinguishment of the test piece was observed by visual inspection, and the combustibility of the waterproof sheet was evaluated on the basis of the following evaluation criteria.

(Evaluation Criteria for Combustibility)

A: The flame was extinguished at a point up to 25 mm (first marked line) from the free end of the test piece.

B: The flame was extinguished at a point beyond the first marked line and up to 100 mm (second marked line) from the free end of the test piece.

C: The flame spread beyond the second marked line to the clamp part (to the proximal end).

The results of these evaluations are shown in Table 1.

TABLE 1

| | | | | Example | | | | | Reference Example | Comparative Example |
|---|---|---|---|---|---|---|---|---|---|---|
| | | | | 1 | 1A | 1B | 2 | 2B | 1 | 1 |
| Waterproof sheet | Vinyl chloride-based resin | Monopolymer of vinyl chloride [parts by weight] | | | | | 100.0 | | | |
| | Plasticizer | Acrylic acid ester monopolymer without functionality [parts by weight] | ARUFON UP-1021 | 65.0 | 80.0 | 80.0 | | | | |
| | | Polyester-based plasticizer [parts by weight] | POLYCIZER W-2640-S | | | | | | 65.0 | |
| | | Diisononyl phthalate [DINP] [parts by weight] | | | | | 40.0 | 40.0 | | 65.0 |
| | | Ethylene-acrylic acid ester copolymer [parts by weight] | ELVALOY HP441 | | | | 50.0 | 50.0 | | |
| | Flame retardant | Antimony trioxide | | | | 1.5 | | 1.5 | | |
| | Stabilizer | Barium-zinc-based stabilizer [parts by weight] | | | | | 6.0 | | | |
| | Stabilizer aid | Epoxidized soybean oil [parts by weight] | | | | | 3.0 | | | |
| | Ultraviolet absorber | Benzotriazole-based ultraviolet absorber [parts by weight] | | | | | 0.5 | | | |
| | Shielding material | Titanium oxide [parts by weight] | | | | | 15.0 | | | |
| | Filler material | Calcium carbonate [parts by weight] | | | | | 20.0 | | | |
| | Coloring material | Carbon black [parts by weight] | MITSUBISHI CARBON BLACK #45 | | | | 0.4 | | | |
| | Average thickness [mm] | | | | | | 2.0 | | | |
| Evaluation | In transferability evaluation, residual ratio of plasticizer | | | A | A | A | B | B | B | C |
| | In volatility evaluation, residual ratio of plasticizer | | | A | A | A | B | B | A | C |
| | In leakage evaluation by repeated wetting and drying, residual ratio plasticiser | | | A | A | A | B | B | B | D |
| | In contamination resistance evaluation, contamination of waterproof sheet | | | B | B | B | B | B | D | B |
| | Combustibility | | | B | C | A | C | A | B | B |

As shown in Table 1, the waterproof sheet of each Example included a (meth)acrylic acid ester-based polymer as a plasticizer and showed a result that leaking of the plasticizer ((meth)acrylic acid ester-based polymer) from the waterproof sheet was suppressed.

In contrast, the waterproof sheet of the Comparative Example did not include a (meth)acrylic acid ester-based polymer as a plasticizer, and therefore, the waterproof sheet could not prevent leaking of the plasticizer from the waterproof sheet.

INDUSTRIAL APPLICABILITY

According to the present invention, the plasticizer contained in the waterproof sheet includes a (meth)acrylic acid ester-based polymer. By having such a configuration, leaking of plasticizers from a waterproof sheet over time due to exposure of the waterproof sheet to rainwater or sunlight can be precisely suppressed or prevented. Therefore, deterioration of the flexibility of the waterproof sheet due to this leaking (bleed-out) of plasticizers, and furthermore, the occurrence of cracks, breakage, and the like in the waterproof sheet can be precisely suppressed or prevented. Therefore, the present invention has industrial applicability.

REFERENCE SIGNS LIST

10: Sheet waterproofing structure
20: Storage tank
21: Bottom plate
22: Cover member
23: Gasket
24: Clip
25: Fixing screw
26: Storage space
30: Waterproof sheet
31: Level difference
35: Test piece
50: Arrangement member
51: Bottom part
52: Rising surface
70: Waterproof sheet
81: Pure water
82: Sludge
100: Building frame
101: Floor part
102: Wall part

The invention claimed is:

1. A waterproof sheet to be included in a sheet waterproofing structure that provides waterproofing to a building frame, the waterproof sheet comprising:
a vinyl chloride-based resin; and
a plasticizer in a liquid state,
wherein the plasticizer includes a (meth)acrylic acid ester-based polymer, and
wherein the plasticizer is included in the waterproof sheet at a content of equal to or more than 20.0 parts by weight and equal to or less than 90.0 parts by weight with respect to 100.0 parts by weight of the vinyl chloride-based resin.

2. The waterproof sheet according to claim 1,
wherein the acrylic acid ester-based polymer is an acrylic acid ester monopolymer without functionality.

3. The waterproof sheet according to claim 2,
wherein the acrylic acid ester monopolymer without functionality has a weight average molecular weight of equal to or more than 1,000 and equal to or less than 5,000.

4. The waterproof sheet according to claim 2,
wherein the acrylic acid ester monopolymer without functionality has a glass transition point Tg of equal to or higher than −100° C. and equal to or lower than −30° C.

5. The waterproof sheet according to claim 1,
wherein the plasticizer is included in the waterproof sheet at a content of equal to or more than 50.0 parts by weight and equal to or less than 75.0 parts by weight with respect to 100.0 parts by weight of the vinyl chloride-based resin.

6. The waterproof sheet according to claim 1, further comprising a stabilizer.

7. The waterproof sheet according to claim 1, further comprising a flame retardant.

8. A waterproof sheet to be included in a sheet waterproofing structure that provides waterproofing to a building frame, the waterproof sheet comprising:
a vinyl chloride-based resin; and
a plasticizer,
wherein the plasticizer includes a (meth)acrylic acid ester-based polymer,
wherein the sheet waterproofing structure includes a first waterproof sheet covering at least a portion of a floor part of the building frame and at least a portion of a wall part erected from the floor part, and
the waterproof sheet is applied to the first waterproof sheet.

9. A waterproof sheet to be included in a sheet waterproofing structure that provides waterproofing to a building frame, the waterproof sheet comprising:
a vinyl chloride-based resin; and
a plasticizer,
wherein the plasticizer includes a (meth)acrylic acid ester-based polymer,
wherein the sheet waterproofing structure includes a first waterproof sheet covering at least a portion of a floor part of the building frame and at least a portion of a wall part erected from the floor part, and a second waterproof sheet covering a portion of the first waterproof sheet, and
the waterproof sheet is applied to the second waterproof sheet.

10. A resin composition used for molding the waterproof sheet according to claim 1, the resin composition comprising:
the vinyl chloride-based resin; and
the plasticizer.

11. A sealing material used for forming a covering layer that selectively covers a vicinity of an end part of the waterproof sheet according to claim 1, the sealing material comprising:
the vinyl chloride-based resin;
the plasticizer; and
a solvent.

12. A resin composition used for molding the waterproof sheet according to claim 8, the resin composition comprising:
the vinyl chloride-based resin; and
the plasticizer.

13. A sealing material used for forming a covering layer that selectively covers a vicinity of an end part of the waterproof sheet according to claim 8, the sealing material comprising:
the vinyl chloride-based resin;
the plasticizer; and
a solvent.

14. A resin composition used for molding the waterproof sheet according to claim 9, the resin composition comprising:
the vinyl chloride-based resin; and
the plasticizer.

15. A sealing material used for forming a covering layer that selectively covers a vicinity of an end part of the waterproof sheet according to claim 9, the sealing material comprising:

the vinyl chloride-based resin;
the plasticizer; and
a solvent.

* * * * *